UNITED STATES PATENT OFFICE.

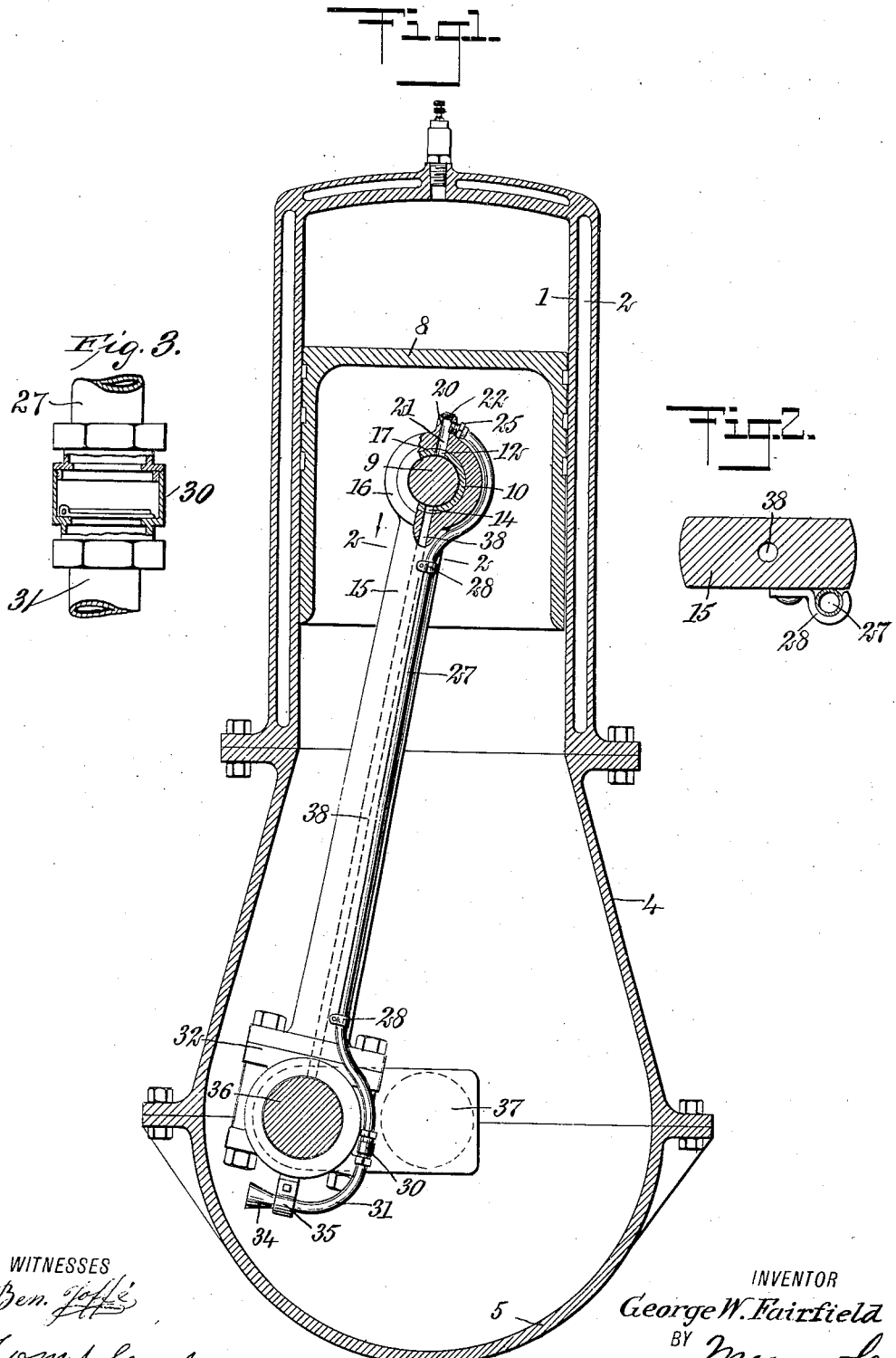

GEORGE WASHINGTON FAIRFIELD, OF THE UNITED STATES NAVY.

OILING SYSTEM FOR ENGINES.

955,062.        Specification of Letters Patent.    Patented Apr. 12, 1910.

Application filed December 26, 1908. Serial No. 469,204.

*To all whom it may concern:*

Be it known that I, GEORGE W. FAIRFIELD, of the U. S. Navy, a citizen of the United States, and a resident of Worcester, in the county of Worcester and State of Massachusetts, have invented a new and Improved Oiling System for Engines, of which the following is a full, clear, and exact description.
This invention relates to oiling systems for engines.

The object of the invention is to provide improved means for automatically oiling the wrist-pin and crank-pin bearings of an engine.

The invention consists in the construction and combination of parts, to be more fully described hereinafter and particularly set forth in the claims.
Reference is to be had to the accompanying drawings forming a part of this specification, in which similar characters of reference indicate corresponding parts in both views, and in which—
Figure 1 is a vertical section taken through a convenient form of internal combustion engine, showing my invention applied thereto; Fig. 2 is a section taken on the line 2—2 in Fig. 1; and Fig. 3 is a detail view partly in section, showing the check valve.

In said drawings, the engine comprises a cylinder 1 having a water-jacket 2 surrounding said cylinder. Said cylinder is bolted at the bottom to the upper face of a crank-pit 4. The lower portion 5 of the crank-pit 4 may be a separate member and bolted to the upper portion 4. Said bottom part 5 may be semi-circular in cross section, and forms the reservoir for a bath of oil, which is to be used in oiling the bearings of the engine.

A hollow piston 8 is mounted to reciprocate within the cylinder 1, and has secured thereon a wrist-pin 9. A sleeve 10 surrounds said wrist-pin 9, and is provided with apertures 12 and 14, on opposite sides of the diameter. A connecting rod 15 is formed at its upper end 16 with a bearing 17 adapted to fit the exterior of the sleeve 10. An oil receptacle 20 may be formed integral with the upper end of the connecting rod and provided with a central passage 21, the outer end of which is closed by a screw-plug 22; and its inner end registers with the aperture 12 in the sleeve 10. Communicating with one side of the oil receptacle 20 is a screw-threaded plug or nipple 25. Said oil receptacle may be made of a separable casting and attached to the upper end of the connecting rod 15 if desired.

A pipe 27 is connected at its upper end to the plug 25, and extends around the end 16 of the connecting rod and along said connecting rod to its lower end. Said pipe 27 is held in position on said connecting rod by means of clips 28.

A check-valve 30 is connected to the pipe 27 at its lower end, and a curved pipe 31 extends from the lower end of the check-valve 30, and thence under the lower end 32 of the connecting rod 15. The outer end of the pipe 31 is flared at 34. Said pipe is supported in a bracket 35 secured to the lower end 32 of the connecting rod 15.

The connecting rod 15 is journaled about the crank-pin 36 of the driven shaft 37. The connecting rod 15 is provided with a longitudinal passage 38 therein, which connects the aperture 14 with the crank pin bearing 32.

The bath of oil within the bottom member 5 of the crank-pit is deep enough to allow the end 34 of the oiling pipe to be immersed therein when the crank is rotated. The oil is forced through the flared open end 34, and the curved portion 31, through the check-valve 30, and then through the pipe 27 to the oil receptacle 20 at the top of the connecting rod. The oil then lubricates the wrist-pin bearing and flows through the aperture 14 and the passage 38 to the crank-pin bearing below, and thence out into the crank-pit. Thus a continuous circulation of oil is provided for the wrist-pin and crank-pin bearings.

Having thus described my invention, I claim as new and desire to secure by Letters Patent:— 100.

1. In an oiling system, the combination with a wrist pin bearing, and a crank pin bearing, of a hollow rod connecting the wrist pin and crank pin and having its bore in communication with said pins, an oil cup on the upper end of the connecting rod and communicating with the wrist pin, a pipe secured to the connecting rod and having its upper end connected with the oil cup, the pipe having a flared lower end extending around the lower end of the said connecting rod and adapted to be immersed in oil as the crank pin is rotated, and a check valve in said pipe.

2. In an oiling system, the combination with a piston having a wrist pin, and a driven shaft having a crank pin, of a hollow rod connecting the wrist and crank pins and having its bore in communication with said pins, an oil cup on the upper end of the connecting rod and communicating with the wrist pin, a pipe secured to the connecting rod and having its upper end connected with the oil cup, a check valve in the lower end of the pipe, and a curved pipe secured to the check valve and connecting rod and having a flared end adapted to be immersed in oil as the crank shaft is rotated.

In witness whereof I have signed my name to this specification in the presence of two subscribing witnesses.

GEORGE WASHINGTON FAIRFIELD.

Witnesses:
RUSSELL BURBANK,
EDWARD COADY.